United States Patent [19]

Takeda et al.

[11] Patent Number: 5,715,219
[45] Date of Patent: Feb. 3, 1998

[54] DISPLACEMENT DETECTING DEVICE FOR OPTICAL HEAD

[75] Inventors: Tadashi Takeda, Nagano-ken; Kenji Fukui, Tokyo; Ricardo Musashi Okamoto, Tokyo; Hiroyuki Wada, Tokyo, all of Japan

[73] Assignee: Nippon Steel Corporation, Tokyo, Japan

[21] Appl. No.: 651,508

[22] Filed: May 22, 1996

Related U.S. Application Data

[63] Continuation of Ser. No. 294,036, Aug. 24, 1994, abandoned, which is a continuation of Ser. No. 981,411, Nov. 25, 1992, abandoned.

[30] Foreign Application Priority Data

Nov. 29, 1991 [JP] Japan .................. 3-340351

[51] Int. Cl.$^6$ .................................................. G11B 7/09
[52] U.S. Cl. .................. 369/44.41; 369/44.32; 369/44.23
[58] Field of Search ................... 369/44.41, 109, 369/120, 44.12, 108, 44.32, 116, 121, 44.23, 44.29, 44.35; 250/201.5

[56] References Cited

U.S. PATENT DOCUMENTS

| | | | |
|---|---|---|---|
| 4,725,721 | 2/1988 | Nakamura et al. | 369/44.24 X |
| 4,922,290 | 5/1990 | Yoshitake et al. | 355/53 |
| 4,929,823 | 5/1990 | Kato et al. | 250/201.5 |
| 4,945,529 | 7/1990 | Ono et al. | 369/109 |
| 4,952,945 | 8/1990 | Hikima | 346/108 |
| 4,973,832 | 11/1990 | Marchant et al. | 369/44.24 X |
| 5,042,042 | 8/1991 | Hori et al. | 372/32 |
| 5,111,448 | 5/1992 | Komma et al. | 369/44.23 |

FOREIGN PATENT DOCUMENTS

| | | |
|---|---|---|
| 62-5677 | 1/1987 | Japan . |
| 63-200328 | 8/1988 | Japan . |
| 287336 | 3/1990 | Japan . |
| 4281227 | 10/1992 | Japan . |
| 4291027 | 10/1992 | Japan . |

*Primary Examiner*—Thang V. Tran
*Attorney, Agent, or Firm*—Pollock, Vande Sande & Priddy

[57] ABSTRACT

A displacement detecting device for optical head is disclosed which is capable of stably generating displacement detecting signals without being affected by fluctuation of wavelength of light emitted from a light source. The displacement detecting device is provided for use in an optical head which comprises a optical sensor for reading information recorded on an optical information recording medium by irradiating the optical information recording medium with light from a light source and detecting reflected light from the irradiated surface of the recording medium as well as detecting focus displacement and track displacement by utilizing diffracted light of the reflected light. The optical sensor is provided with wavelength fluctuation component detector for detecting wavelength fluctuation components in the reflected light. At least one of a focus displacement detecting signal and a track displacement detecting signal is compensated for based on a wavelength fluctuation detecting signal generated by the wavelength fluctuation component detector, thereby enabling the displacement detection to be stably performed without being affected by fluctuation of the wavelength of light emitted from a light source.

22 Claims, 11 Drawing Sheets

HATCHED PORTION : PATTERN FOR WE DETECTION
BLANK PORTION : PATTERN FOR FE/TE DETECTION

DISPLACEMENT DETECTING DEVICE FOR OPTICAL HEAD

This application is a Continuation of U.S. patent application Ser. No. 08/294,036, filed Aug. 24, 1994, abandoned, which is a continuation of U.S. patent application Ser. No. 07/981,411, filed Nov. 25, 1992, abandoned.

BACKGROUND OF THE INVENTION

1. Field of the Invention

The present invention relates to an optical head for reading information recorded on an optical information recording medium by irradiating the optical information recording medium with a light beam from a light source and detecting a reflected light beam from the irradiated surface of the medium, and more particularly to a displacement detecting device for optical head for detecting focus displacement and track displacement by utilizing diffraction of the reflected light.

2. Description of the Prior Art

Figure 11:
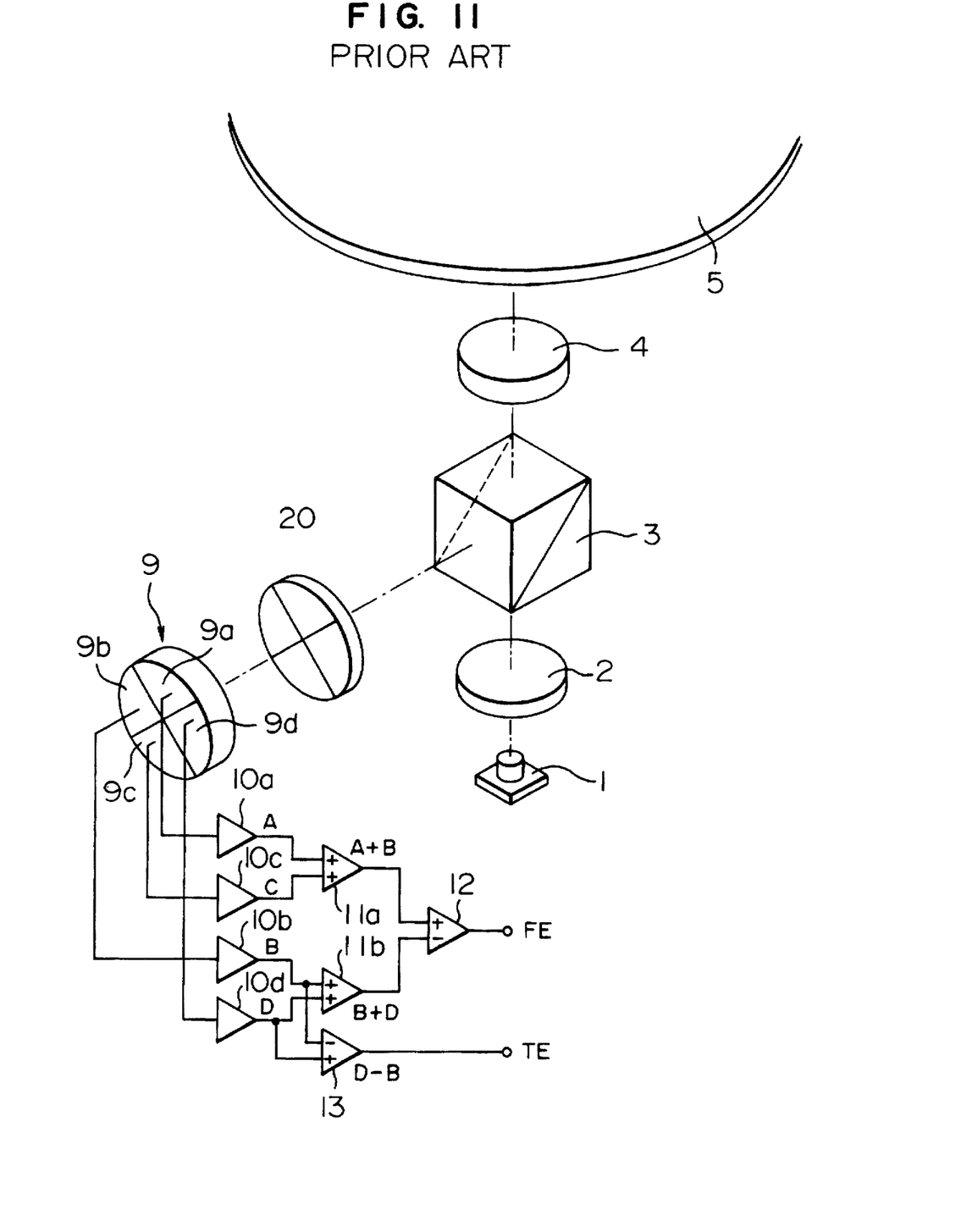
FIG. 11 is a diagram showing the structure of a conventional displacement detecting device for optical head.

FIG. 11 illustrates an example of a conventional displacement detecting device for optical head disclosed in JP-A-2-87336.

Referring to FIG. 11, laser light emitted from a laser light source 1 is converted into a bundle of parallel rays by a collimator lens 2. The collimated rays are applied to an information recording medium 5 via a beam splitter 3. The irradiating laser rays are focused on the information recording medium by an objective lens 4. This objective lens 4 is driven by a driver, which is not shown, and is subjected to feedback control so that rays may be always focused on the information recording medium 5. Reflected rays from the information recording medium 5 are split by the beam splitter 3 via the objective lens 4 and led to a displacement detecting system called "astigmatism system." Rays for detecting focus displacement split by the beam splitter 3 are applied onto a quadrifid photodetector 9 via a quadrifid Fresnel zone plate 20. The quadrifid Fresnel zone plate 20 diffracts rays for detecting focus displacement to convert into an astigmatic bundle of rays having a wave front which is not homocentric.

Figure 12A:
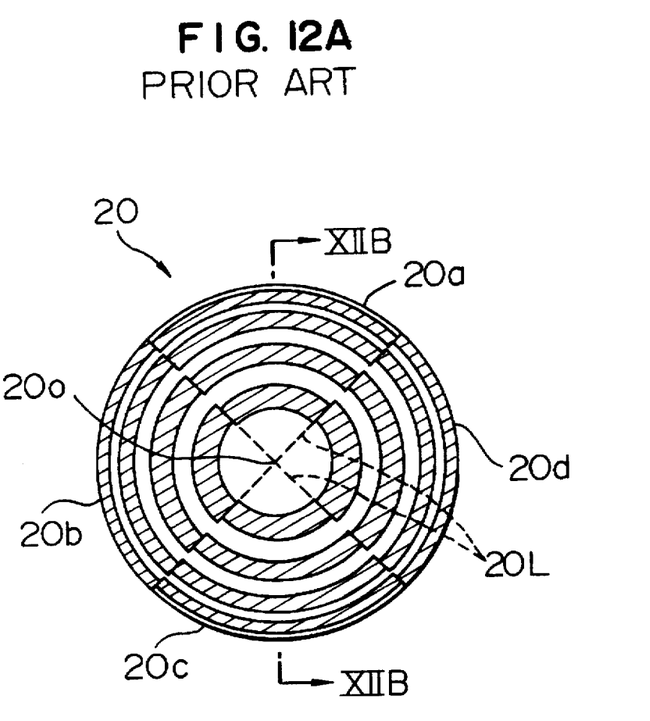
FIG. 12A is a plan view of a quadrifid Fresnel zone plate having four sectors defined by curves employed in a conventional displacement detecting device for optical head.
Figure 12B:
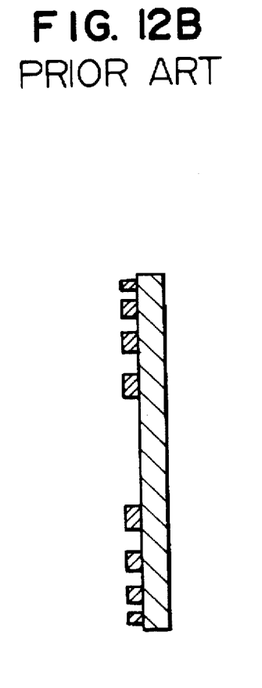
FIG. 12B is a cross-sectional view of the quadrifid Fresnel zone plate taken along the line XIIB—XIIB in FIG. 12A.

FIG. 12A shows a plan view of a quadrifid Fresnel zone plate, and FIG. 12B a cross-sectional view of the same taken along the line XIIB—XIIB.

As shown in FIGS. 12A and 12B, the quadrifid Fresnel zone plate 20 is divided into four sectors 20a, 20b, 20c and 20d by two partition lines 20L passing through the center 20o which are perpendicular to each other. Further, optical unevenness taking the shape of curves as represented by hatchings in FIG. 12A are formed so that the opposing diagonal sectors 20a and 20c may have primary diffracted rays converged at the same focal length while the other pair of diagonal sectors 20b and 20d may have primary diffracted rays converged at the same focal length which is different from that of the diagonal sectors 20a and 20c.

The quadrifid Fresnel zone plate 20 thus formed are disposed so that the two partition lines 20L may coincide with the two partition lines of the quadrifid photodetector 9 when they are viewed from the direction of the optical axis.

Detected signals A, B, C and D respectively fed from the photodetecting sectors 9a, 9b, 9c and 9d of the quadrifid photodetector 9 are subjected to processing in adders 11a and 11b and a subtractor 13 via operational amplifiers 10a, 10b, 10c and 10d to output a focus displacement signal FE. In addition, the detected signals B and D are subjected to processing in a subtractor 13 to output a track displacement signal TE. The focus displacement signal FE and the track displacement signal TE are represented by the following equations:

$$FE=(A+C)-(B+D),$$

$$TE=(D-B).$$

Figure 13A:
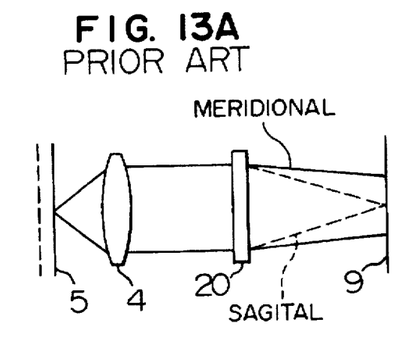
FIG. 13A is a diagram for explaining the state of a bundle of rays when an information recording medium is positioned on the front side of the focal point of an objective lens arranged in the displacement detecting device for an optical head of the prior art.
Figure 13B:
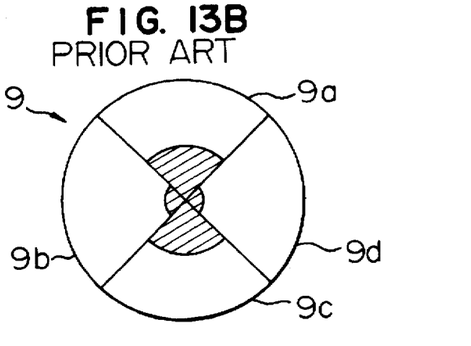
FIG. 13B illustrates an image formed by the displacement detecting rays in the state shown in FIG. 13A.

FIGS. 13A, 13B, 14A, 14B, 15A and 15B are diagrams for explaining profiles of optical images projected on the quadrifid photodetector 9 depending on the position of the objective lens 4 with respect to the information recording medium 5. Referring to FIG. 13A, if the information recording medium 5 is disposed on this side of the focal point of the objective lens 4, the displacement detecting rays form images so that images may become large on photodetecting sectors 9a and 9c of the quadrifid photodetector 9 and images may become small on the other photodetecting sectors 9b and 9d as shown in FIG. 13B. Therefore, the focus displacement signal FE becomes positive.

Figure 14A:
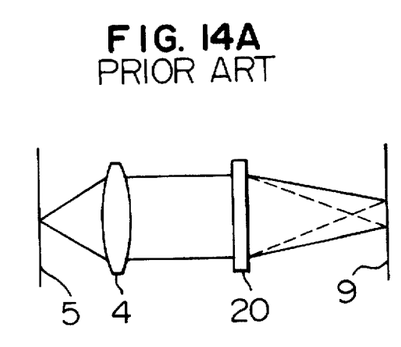
FIG. 14A is a diagram for explaining the state of a bundle of rays when an information recording medium is positioned on the focal point of the objective lens arranged in the displacement detecting device for the optical head of the prior art.
Figure 14B:
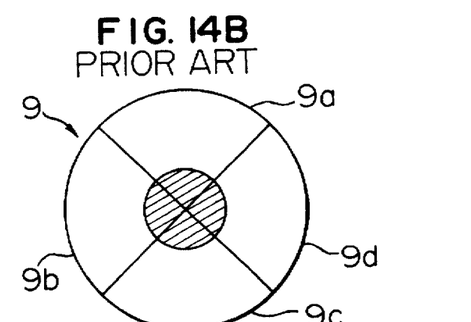
FIG. 14B illustrates an image formed by the displacement detecting rays in the state shown in FIG. 14A.

Referring to FIG. 14A, if the information recording medium 5 is accurately located on the focal point of the objective lens 4, the rays for detecting displacement form a circular beam on the quadrifid photodetector 9 as shown in FIG. 14B. Therefore, detection signals A, B, C and D of the photodetecting sectors 9a, 9b, 9c and 9d have the same magnitude as shown in FIG. 14B. Therefore, the focus displacement signal FE becomes 0.

Figure 15A:
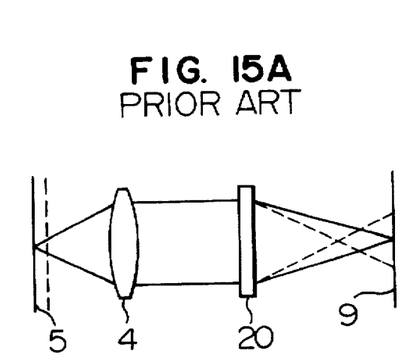
FIG. 15A is a diagram for explaining the state of a bundle of rays when an information recording medium is positioned beyond the focal point of the objective lens arranged in the displacement detecting device for the optical head of the prior art.
Figure 15B:
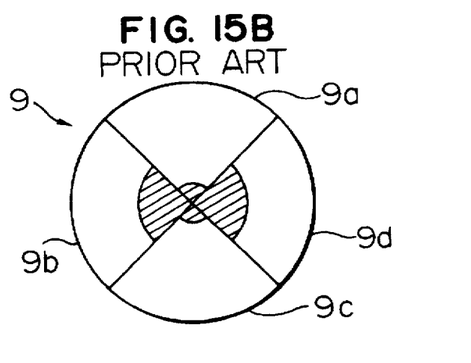
FIG. 15B illustrates an image formed by the displacement detecting rays in the state shown in FIG. 15A.

Referring to FIG. 15A, if the information recording medium 5 is located beyond the focal point of the objective lens 4, the rays for detecting displacement form images so that images may become small on the photodetecting sectors 9a and 9c of the quadrifid photodetector 9 and images may become large on the photodetecting sectors 9b and 9d as shown in FIG. 15B. Therefore, the focus displacement signal FE becomes negative.

In this way, the focus displacement signal FE varies according to the position of the information recording medium 5 with respect to the objective lens 4. By feeding back this focus displacement signal FE to the driver for driving the objective lens 4 in the focus direction, control is exercised so that the laser rays may form a focal point just on the information recording medium 5.

Figure 16:
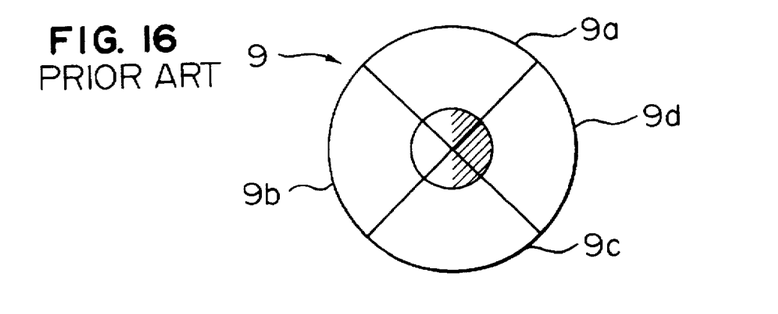
FIG. 16 illustrates an image formed by displacement detecting rays for track displacement detection in a displacement detecting device for the optical head of the prior art.

The case where only focus displacement is involved but track displacement is absent is shown in FIGS. 13A, 13B, 14A, 14B, 15A and 15B. If the focus displacement is absent and track displacement is present, however, an image as shown in FIG. 16 is formed on the quadrifid photodetector 9. That is to say, the shape of the image is identical with that in focus as shown in FIG. 14B. However, the brightness varies according to the track displacement. FIG. 16 illustrates that track displacement has occurred in the lateral direction, wherein light amounts received by the photodetector sectors 9d and 9b are different from each other depending on track displacement, while light amounts received by the photodetector sectors 9a and 9c do not vary. The track displacement detecting signal TE, thus, becomes positive or negative depending on track displacement. By feeding back this track displacement detecting signal TE to the driver for driving the objective lens 4 in the focus direction, the driver is controlled so as to accurately focus the laser rays on the track of the information recording medium 5.

Positions of partition lines of the quadrifid photodetector 9 and the quadrifid Fresnel zone plate 20 need not be the positions shown in FIG. 11 as long as partition lines of the quadrifid photodetector 9 respectively coincide with the corresponding partition lines of the quadrifid Fresnel zone plate 20 when viewed from the direction of the optical axis. For example, the quadrifid photodetector 9 and the quadrifid Fresnel zone plate 20 may be so disposed as to be rotated by 45 degrees around the optical axis as compared with the illustrated positions. In this case, the track displacement signal TE is represented by the following equation:

$$TE=(A-C)+(D-B).$$

Figure 7:
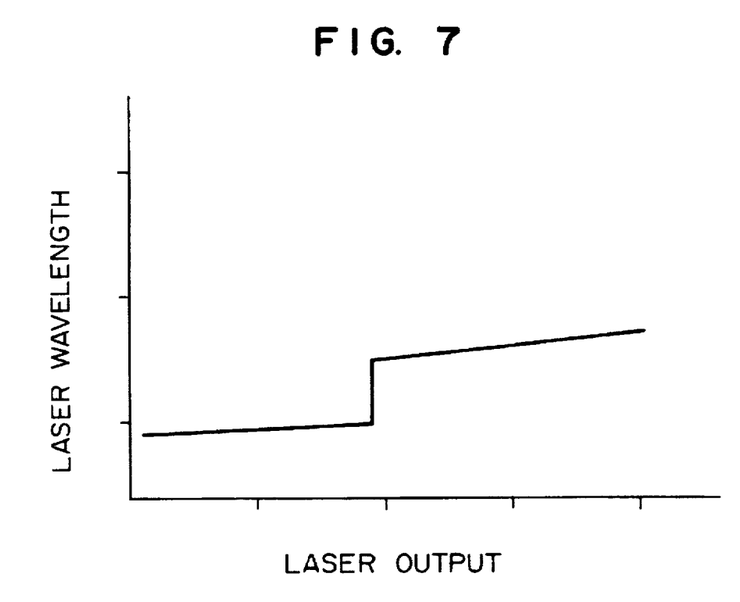
FIG. 7 is a graph showing the relationship between a laser output of a laser light source and the oscillation wavelength.
Figure 8:
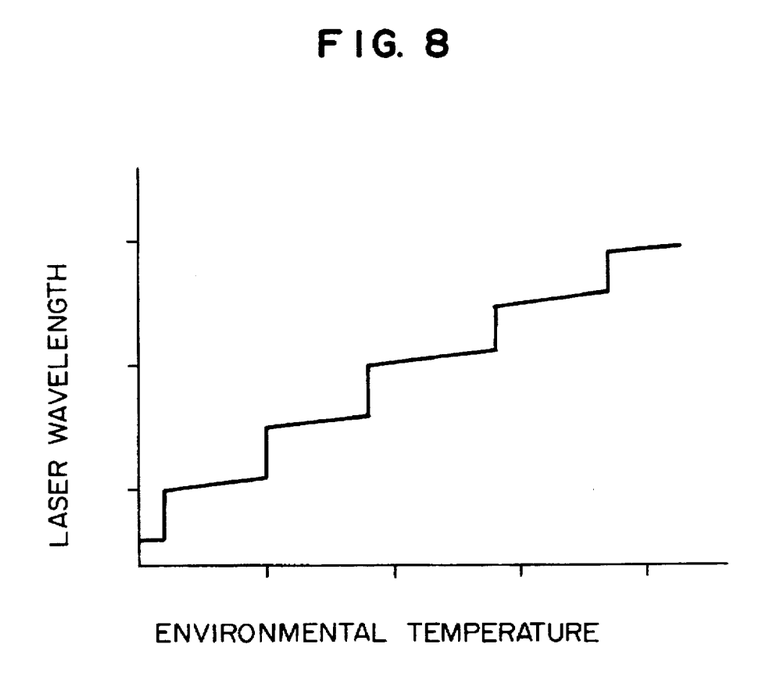
FIG. 8 is a graph showing the relationship between an environmental temperature around the laser light source and the oscillation wavelength.

An optical head employing optical elements utilizing diffraction of light, as described above, generally uses a semiconductor laser as a light source. It is known that the oscillation wavelength of the semiconductor laser fluctuates due to, for example, the laser output and environmental temperature. FIG. 7 illustrates the typical relationship between a laser output of a laser light source and the oscillation wavelength. The graph of FIG. 7 shows that as the laser output (abscissa) increases, the oscillation wavelength (ordinate) also increases, where the oscillation wavelength may occasionally increase in a step manner. FIG. 8 illustrates the relationship between the environmental temperature around a laser light source and the oscillation wavelength. The laser wavelength (ordinate) increases as the environmental temperature rises, where step-like increases frequently occur.

Since the wavelength of light fluctuates as shown in the graphs, focus displacement and track displacement detected by utilizing diffraction of the light are affected by the environmental temperature, thereby making it difficult to derive accurate displacement detecting signals.

SUMMARY OF THE INVENTION

The present invention has been made to solve the above-mentioned problem, and its object is to provide a displacement detecting device for optical head which is capable of stably generating displacement detecting signals without being affected by fluctuation in the wavelength of a laser beam emitted from a light source.

The above object is achieved by a displacement detecting device for an optical head which has optical means for reading information recorded on an optical information recording medium by irradiating light from a light source and detecting reflected light from the irradiated surface of the recording medium as well as detecting focus displacement and track displacement by utilizing diffracted light of the reflected light, wherein the optical means comprises wavelength fluctuation component detecting means for detecting wavelength fluctuation components of the reflected light. The displacement detecting device is characterized by compensating for at least one of a focus displacement detecting signal and a track displacement detecting signal based on a wavelength fluctuation detecting signal. Specifically, the wavelength fluctuation detecting means comprises diffracting means for separating a light path of rays for focus displacement and track displacement detection and a light path of rays for wavelength fluctuation detection, and a photodetector disposed in the vicinity of the focus position of the ray for wavelength fluctuation detection separated by the diffracting means for detecting the shape of a bundle of rays for wavelength fluctuation detection. Preferably, the wavelength fluctuation detecting means further comprises an integrally formed hologram member having a converging action for converging the rays for focus displacement detection and the rays for wavelength fluctuation detection.

The displacement detecting device of the present invention employs the diffracting means to separate reflected light from the irradiated surface of the information recording medium into a bundle of rays for focus displacement and track displacement detection and a bundle of rays for wavelength fluctuation detection. The shape of the separated bundle of rays for wavelength fluctuation detection is electrically detected by the photodetector. When the shape of the rays is detected displaced from a normal position in accordance with wavelength fluctuation, at least one of the focus displacement detecting signal and the track displacement detecting signal is compensated for, thereby preventing the displacement detecting signals from being affected by the wavelength fluctuation.

BRIEF DESCRIPTION OF THE DRAWINGS

FIG. 6, comprising FIGS. 6(a)–6(i), illustrates a variety of patterns for separating a bundle of rays for wavelength fluctuation detection;

DESCRIPTION OF THE PREFERRED EMBODIMENTS

Preferred embodiments of the present invention will hereinafter be described in detail with reference to the accompanying drawings.

Figure 1:
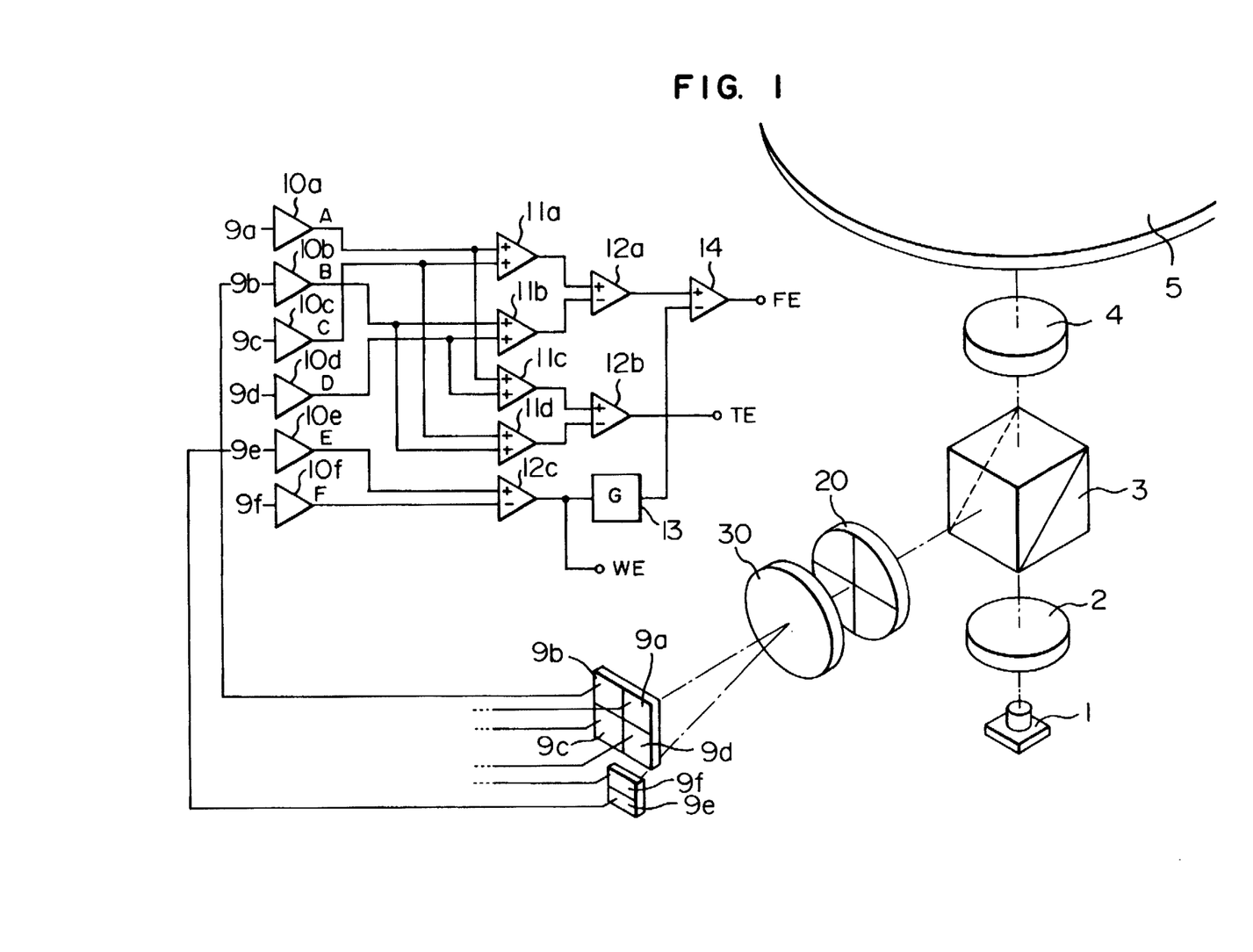
FIG. 1 is a schematic perspective view showing the structure of a displacement detecting device for an optical head according to a first embodiment, to which the present invention is applied, together with a block diagram of a signal processing circuit.

FIG. 1 illustrates the structure of a displacement detecting device for optical head according to a first embodiment of the present invention. In FIG. 1, the same components as those of the conventional optical head shown in FIG. 11 are designated by the same reference numerals and detailed explanation thereof will be omitted. In this embodiment, part of reflected rays is separated from an optical system, constructed similarly to the prior art, for focus displacement detection and track displacement detection and used to detect fluctuation in wavelength by an optical means utilizing diffraction of light.

A quadrifid Fresnel zone plate 20 used in this embodiment for focus displacement detection and track displacement detection is similar to a conventional quadrifid Fresnel zone plate, and another zone plate 30 for wavelength fluctuation detection is disposed between this quadrifid Fresnel zone plate 20 and a sexpartite photodetector 19, referred to later.

The photodetector 19 comprises a quadrifid photodetector $9a$, $9b$, $9c$ and $9d$ for focus displacement detection and track displacement detection, constructed similarly to the prior art, and a twin photodetector $9e$ and $9f$.

Figure 2A:
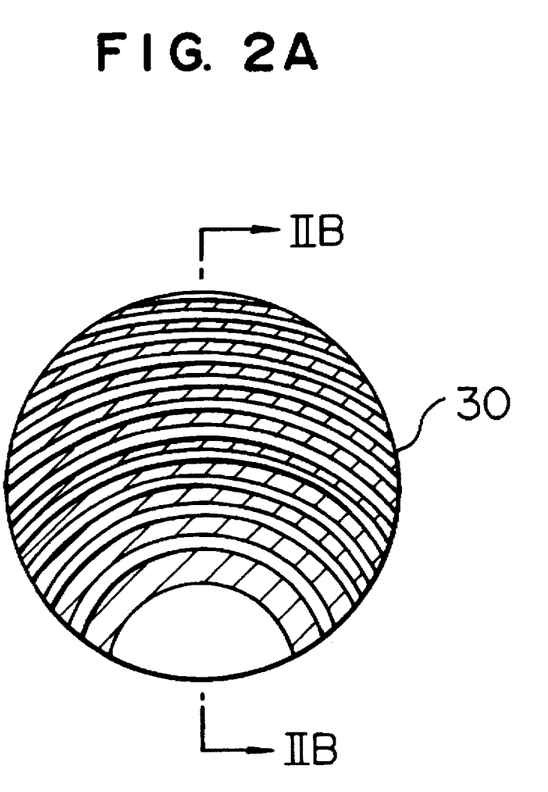
FIG. 2A is a plan view showing a zone plate used for detecting wavelength displacement of the optical head.
Figure 2B:
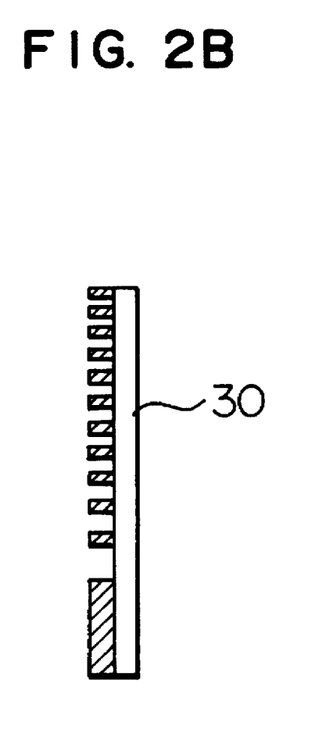
FIG. 2B is a cross-sectional view of the zone plate taken along the line IIB—IIB in FIG. 2A.

The zone plate 30 for wavelength fluctuation detection is conceptually illustrated in FIG. 2 in an enlarged scale. This zone plate 30 is formed with a concentric fringe pattern for deflecting primary diffracted light such that the primary diffracted light converges at a single point other than on a light detecting plane for wavelength fluctuation detection. A bundle of rays among the first order diffracted light of the quadrifid Fresnel zone plate 20, which transmits the zone plate 30 as light of 0-th order, is led to the quadrifid photodetector $9a$, $9b$, $9c$ and $9d$ of the sexpartite photodetector 19. Also, among the light of 0-th order of the quadrifid Fresnel zone plate 20, first order diffracted light diffracted by the zone plate 30 is led to the twin photodetector $9e$ and $9f$. Assuming that a track on an information recording medium 5 is placed in the meridional direction in FIG. 1, the zone plate 30 is disposed such that the focal point of the first order diffracted light of the zone plate 30 is positioned along the meridional direction from the optical axis.

Meanwhile, a partition line for dividing the twin photodetector into two sectors $9e$ and $9f$ of the photodetector 19 for wavelength fluctuation detection is defined so as to be perpendicular to the track direction.

Detected signals A, B, C and D respectively generated from the quadrifid photodetector sectors $9a$, $9b$, $9c$ and $9d$ are processed by adders $11a$ to $11d$ and a subtractor $12a$ to output a focus displacement detecting signal FE as well as processed by a subtractor $12b$ to output a track displacement detecting signal TE. The focus displacement detecting signal FE and the track displacement detecting signal TE are represented by the following equations:

$$FE=(A+C)-(B+D),$$

$$TE=(A+D)-(B+C).$$

The thus derived focus displacement detecting signal FE may include fluctuation components due to wavelength fluctuation in addition to net focus displacement components.

Signals E and F respectively generated from the twin photodetector sectors $9e$ and $9f$ are processed by a subtractor $12c$, and thereafter a differential signal WE between these signals E and F is subjected to gain adjustment by a gain adjusting circuit 13, and then supplied to a subtractor 14 which subtracts the differential signal WE from the focus displacement detecting signal FE including wavelength fluctuation components, thereby deriving a focus displacement detecting signal FE' with the wavelength fluctuation components removed therefrom at an output terminal of the subtractor 14. The relationship between the differential signal or wavelength fluctuation displacement detecting signal WE and the focus displacement detecting signal FE' excluding the wavelength fluctuation components is represented by the following equations:

$$WE=(E-F),$$

$$FE'=(A+C)-(B+D)-G*(E-F),$$

where G is a coefficient for gain adjustment.

Since the partition line for dividing the twin photodetector 9e and 9f for wavelength fluctuation detection is defined so as to be perpendicular to the track direction as described above, the wavelength fluctuation displacement detecting signal WE can be generated without being affected by track displacement. Also, when no wavelength fluctuation is present, rays on the optical axis incident to the zone plate 30 are positioned on the partition line of the twin photodetector.

On the twin photodetector sectors 9e and 9f, images as shown in FIGS. 3A, 3B, 3C, 4A, 4B, 4C, 5A, 5B and 5C are formed in accordance with the position of an objective lens 4 with respect to the information recording medium 5 and wavelength fluctuation.

Figure 3A:
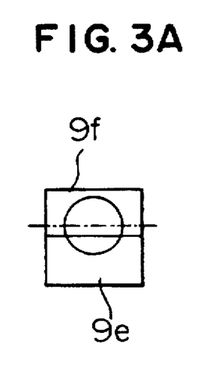
FIG. 3A is a diagram showing an image of displacement detecting rays formed on a twin light detector when the wavelength of light emitted by an optical head fluctuates in a minus direction and the focal point of the light is placed in front of an information recording medium.
Figure 3B:
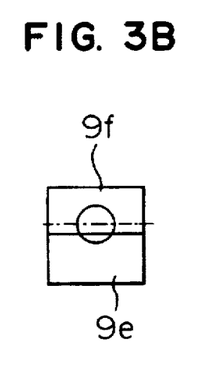
FIG. 3B is a diagram showing an image of the displacement detecting rays formed on the twin light detector when the wavelength of the emitted light fluctuates in the minus direction and the focal point is placed on the information recording medium.
Figure 4A:
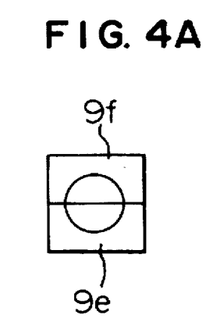
FIG. 4A is a diagram showing an image of the displacement detecting rays formed on the twin light detector when the wavelength of the emitted light does not fluctuate and the focal point is placed in front of the information recording medium.
Figure 4B:
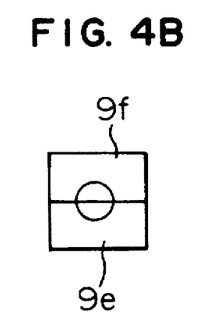
FIG. 4B is a diagram showing an image of the displacement detecting rays formed on the twin light detector when the wavelength of the emitted light does not fluctuate and the focal point is placed on the information recording medium.
Figure 5A:
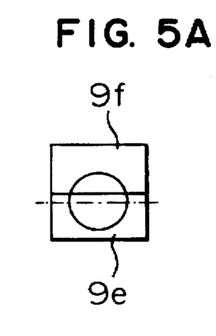
FIG. 5A is a diagram showing an image of the displacement detecting rays formed on the twin light detector when the wavelength of the emitted light fluctuates in a plus direction and the focal point is placed in front of the information recording medium.
Figure 5B:
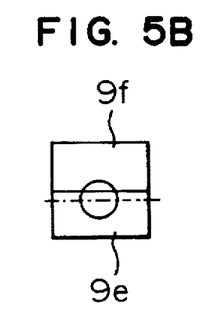
FIG. 5B is a diagram showing an image of the displacement detecting rays formed on the twin light detector when the wavelength of the emitted light fluctuates in the plus direction and the focal point is placed on the information recording medium.

Referring first to FIGS. 3B, 4B and 5B, when the information recording medium 5 is accurately positioned on the focal point of the objective lens 4, the centroid of a bundle of wavelength fluctuation displacement detecting rays moves in the direction perpendicular to the partition line of the photodetecting sectors in accordance with wavelength fluctuation. Specifically, when the actual wavelength of light emitted from a light source becomes shorter than a set wavelength that is, when a wavelength difference is smaller than 0, or Δλ<0, the wavelength fluctuation displacement detecting signal WE becomes negative. When no wavelength fluctuation is present, or Δλ=0, the wavelength fluctuation displacement detecting signal WE becomes 0 since the centroid of the bundle of rays is on the partition line. Further, when the actual wavelength of the light from the light source becomes longer than the set wavelength, or Δλ>0, the wavelength fluctuation displacement detecting signal WE becomes positive.

Figure 3C:
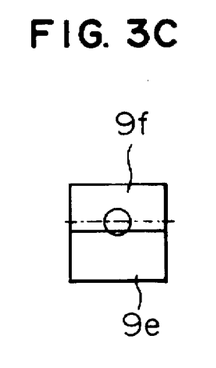
FIG. 3C is a diagram showing an image of the displacement detecting rays formed on the twin light detector when the wavelength of the emitted light fluctuates in the minus direction and the focal point is placed beyond the information recording medium.
Figure 4C:
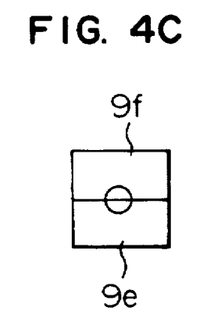
FIG. 4C is a diagram showing an image of the displacement detecting rays formed on the twin light detector when the wavelength of the emitted light does not fluctuate and the focal point is placed beyond the information recording medium.
Figure 5C:
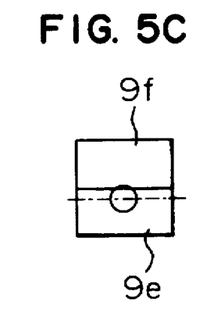
FIG. 5C is a diagram showing an image of the displacement detecting rays formed on the twin light detector when the wavelength of the emitted light fluctuates in the plus direction and the focal point is placed beyond the information recording medium.

Even if the focal point of the objective lens 4 is not on the information recording medium 5, the centroid of the bundle of rays will not move in the cause of the distance between the focal point of the objective lens 4 and the information recording medium, so that displacement due to wavelength fluctuation can be solely detected by the difference of the signals generated by the twin photodetector 9e and 9f. Incidentally, FIGS. 3A, 4A and 5A illustrate cases where the focal point is in front of the information recording medium, whereas FIGS. 3C, 4C and 5C illustrate cases where the focal point is behind the information recording medium.

Since the wavelength fluctuation displacement detecting signal WE only changes in accordance with wavelength fluctuation as described above, this wavelength fluctuation displacement detecting signal WE is subtracted from a focus displacement detecting signal generated by the conventional detecting principle to thereby derive a focus displacement detecting signal free from the influence of wavelength fluctuation.

Figure 6:
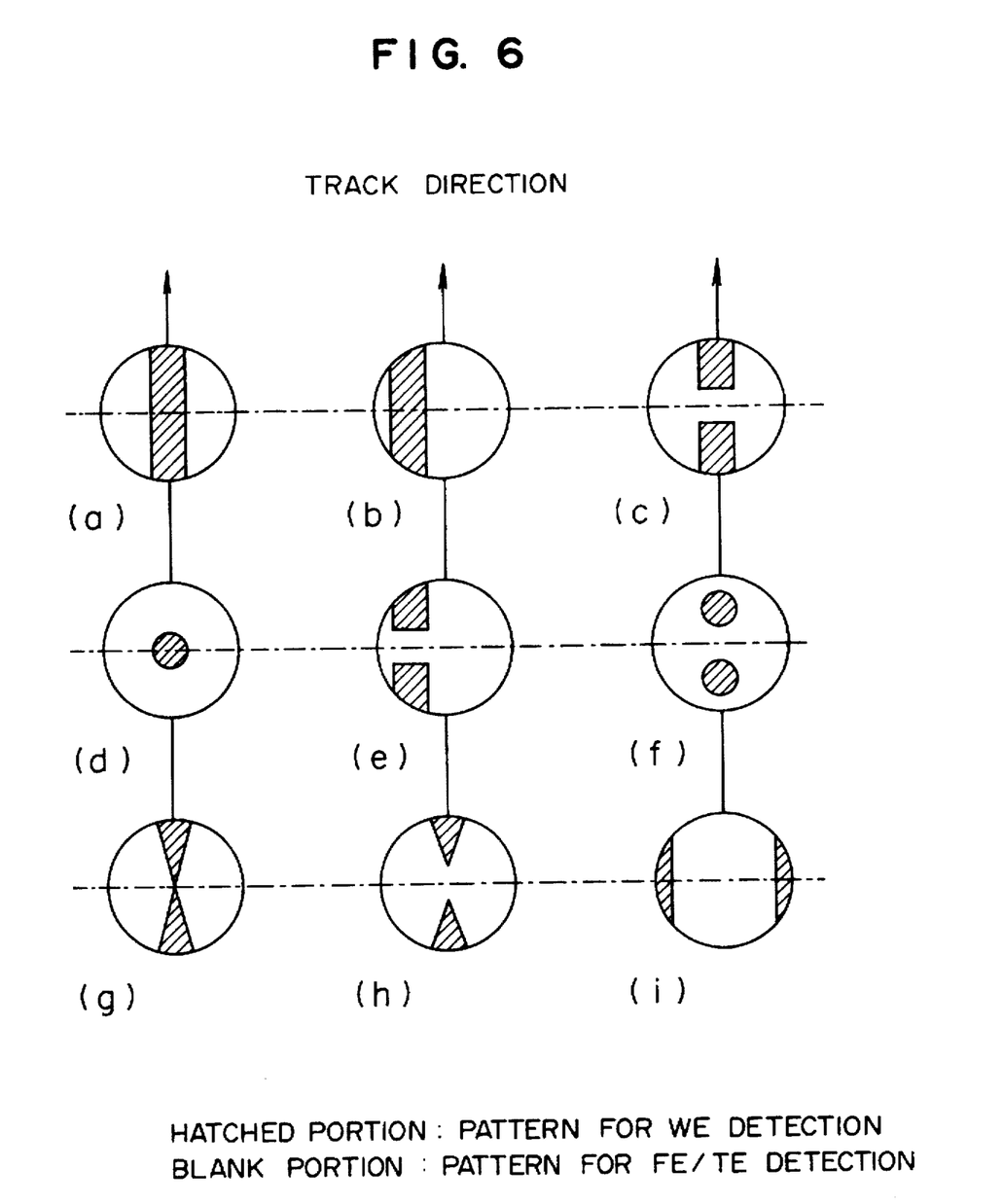

Incidentally, the quadrifid Fresnel zone plate 20 for focus displacement detection and track displacement detection and the zone plate 30 for wavelength fluctuation detection may be integrally formed. In this case, the fringe pattern for wavelength fluctuation detection need not be formed on the whole surface of an element as shown in FIG. 2A but may be formed without any restriction to the number of patterns, a pattern area and a pattern shape, as long as symmetric patterns for detecting wavelength fluctuation are formed on both sides of the optical axis in the track direction. FIGS. 6(a) to 6(i) illustrate examples of patterns for separating a bundle of rays into rays for wavelength fluctuation detection and rays for focus displacement and track displacement detection. In the drawings, hatched portions indicate the patterns for deriving a bundle of rays for wavelength fluctuation detection. For example in the embodiment of FIG. 1, the hatched patterns in the drawings are formed so as to direct a bundle of rays downwardly in FIG. 1, that is, toward the twin photodetector 9e and 9f. In this manner, the number of zone plates can be reduced.

The pattern shown in FIG. 6(d) is the effective pattern for eliminating the cross talk of the focus error signals and the wavelength fluctuation signals. Because at the center area of a bundle of rays little affected by displacement of focusing.

Alternatively, the above-mentioned integral zone plate may be holographically created, for example, by the action of interference of two spherical waves generated from point light sources which are two focal points of an astigmatic bundle of rays for focus displacement detection, a spherical wave generated from a of rays for wavelength fluctuation detection, and a reflected plane wave of an information recording medium. In this case, respective patterns are not separated as shown in FIG. 6, but a composite pattern is formed over the whole surface of a hologram element.

Figure 9:
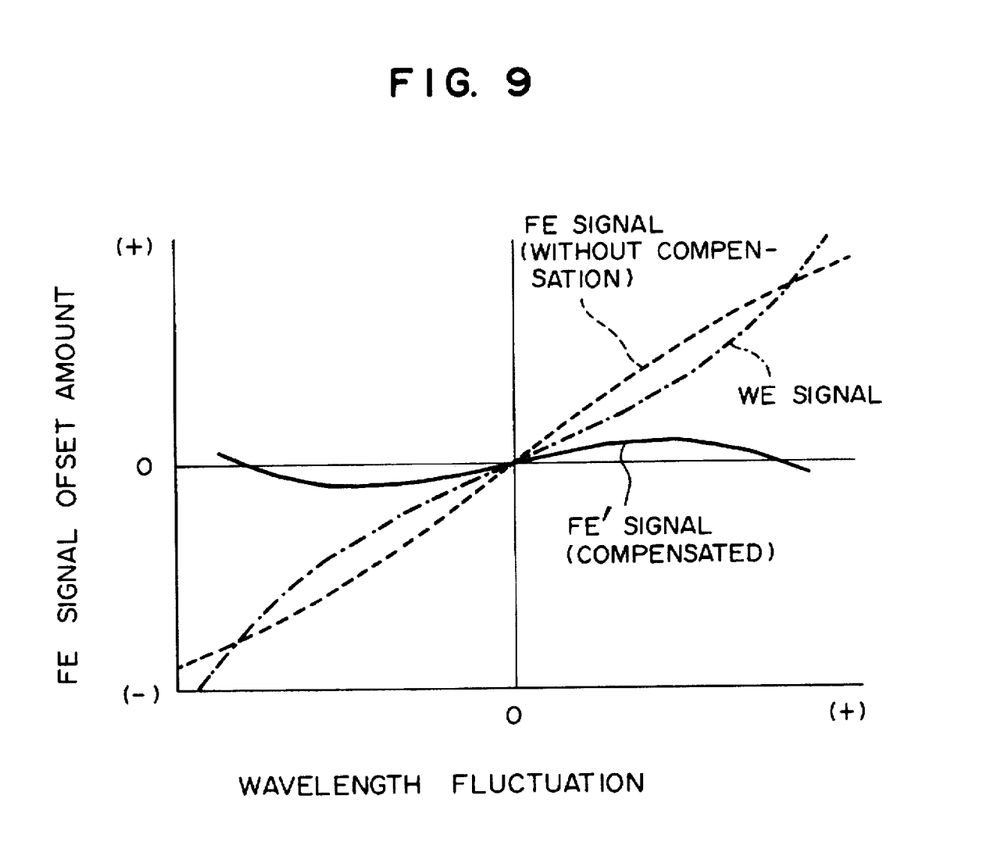
FIG. 9 is a graph showing the principle of compensating for a focus displacement detecting signal.

FIG. 7 illustrates the relationship between a laser output of a laser light source and the oscillation wavelength, and FIG. 8 illustrates the relationship between an environmental temperature and the oscillation wavelength. Further, FIG. 9 illustrates how the focus displacement detecting signal is compensated for according to the present invention in the relationships shown in FIGS. 7 and 8. Specifically, the signal FE before compensation is such that an offset amount thereof fluctuates in accordance with wavelength fluctuation Δλ. Since the signal WE also exhibits the substantially same output tendency as the signal FE, the signal FE' compensated for by subtracting the signal WE multiplied with a correction coefficient from the signal FE presents a smaller offset because the influence of wavelength fluctuation is canceled by this compensation. It can be seen from FIG. 9 that the influence of wavelength fluctuation exerted on the compensated focus displacement detecting signal FE' is remarkably improved as compared with the signal FE before the compensation.

Figure 10:
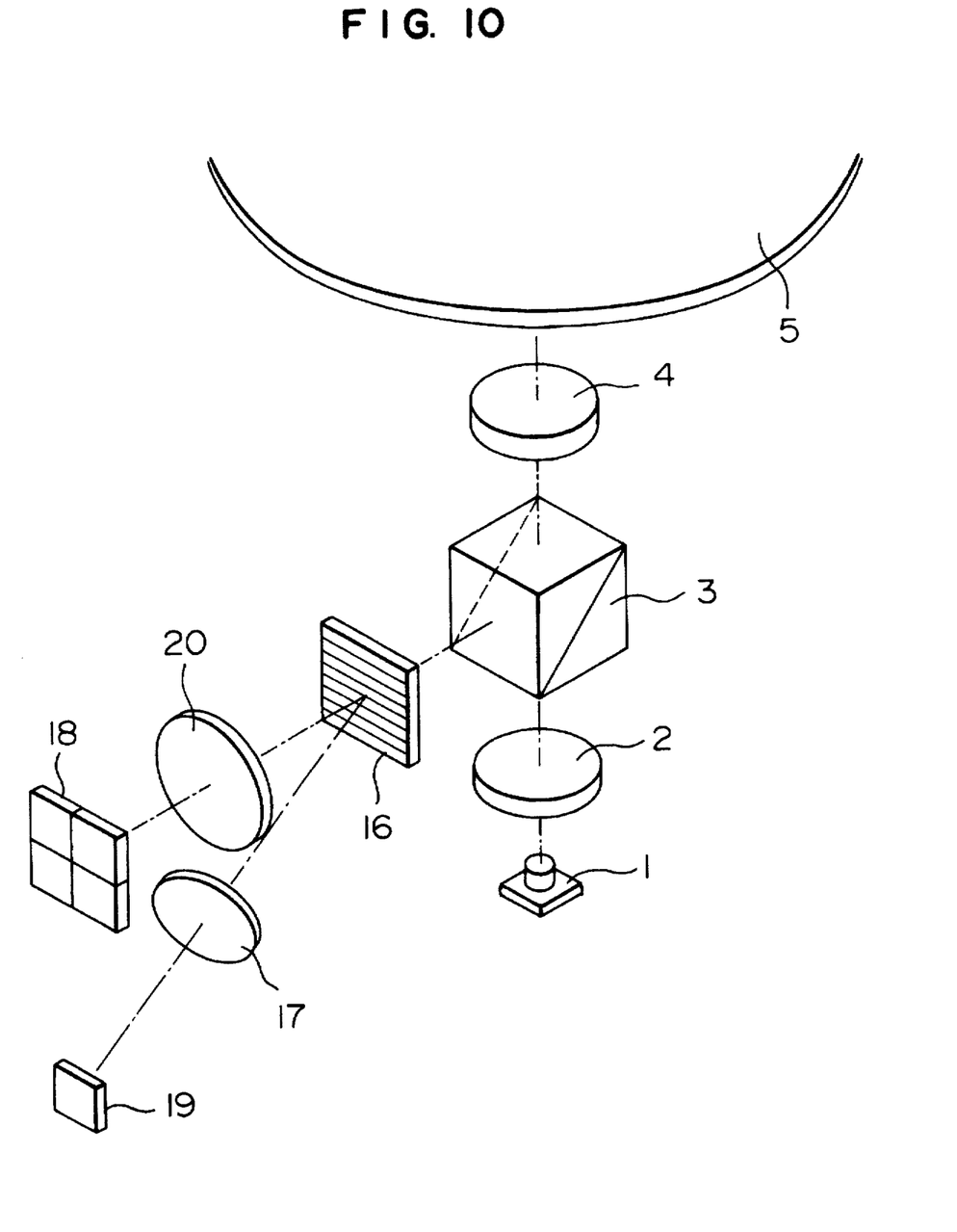
FIG. 10 is a perspective view, similar to FIG. 1, showing the structure of a displacement detecting device for an optical head according to a second embodiment, to which the present invention is applied.

FIG. 10 illustrates a second embodiment to which the present invention is applied. While the first embodiment employs the zone plate 30 to separate a light path for a bundle of rays for wavelength fluctuation displacement detection and a light path for a bundle of rays for focus displacement detection and track displacement detection and converge both bundles of rays, the second embodiment employs a diffraction grating 16 to separate the light paths and also employs converging lenses to converge the bundles of rays. Specifically, a bundle of rays from a beam splitter 3 is incident to the grating 16, the first order diffracted light of which is converged by a converging lens 17 and led to a position sensing device (PSD) 19. On the other hand, the diffracted light of 0-th order is led to a quadrifid Fresnel zone plate 20, the primary diffracted light of which is led to a quadrifid photodetector 18. A method of detecting a focus displacement detecting signal and a track displacement detecting signal in the quadrifid photodetector 18 is similar to that of the first embodiment. Also, a method of detecting wavelength fluctuation components in the PSD 19 is similar to that of the first embodiment.

Incidentally, while the first embodiment detects displacement due to wavelength fluctuation by the twin photodetector sectors 9e and 9f and the second embodiment by the PSD 19, any other means, for example, such as a CCD may be employed for such detection as long as it can detect movement of the centroid of a bundle of rays for wavelength fluctuation displacement detection.

As described above, the present invention allows displacement due to wavelength fluctuation to be readily detected, and realizes a displacement detecting device for optical head which can stably detect displacement without being affected by fluctuation of the wavelength of light emitted by a light source.

Incidentally, the foregoing embodiments have been described for the case where the focus displacement detecting signal alone is affected by fluctuation of the wavelength. It should be noted, however, that the track displacement detecting signal may also be affected by such fluctuation of the wavelength. The influenced track displacement detecting signal can also be compensated for in the same manner as the focus displacement detecting signal by the wavelength fluctuation displacement detecting signal WE.

Figure 17:
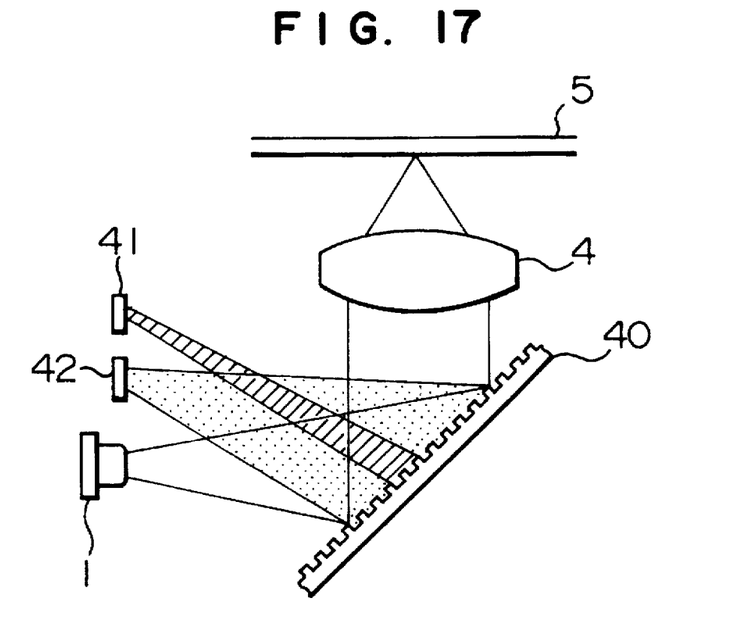
FIG. 17 is a side view showing the structure of a displacement detecting device for an optical head according to a third embodiment together with a block diagram of a signal processing circuit.
Figure 18:
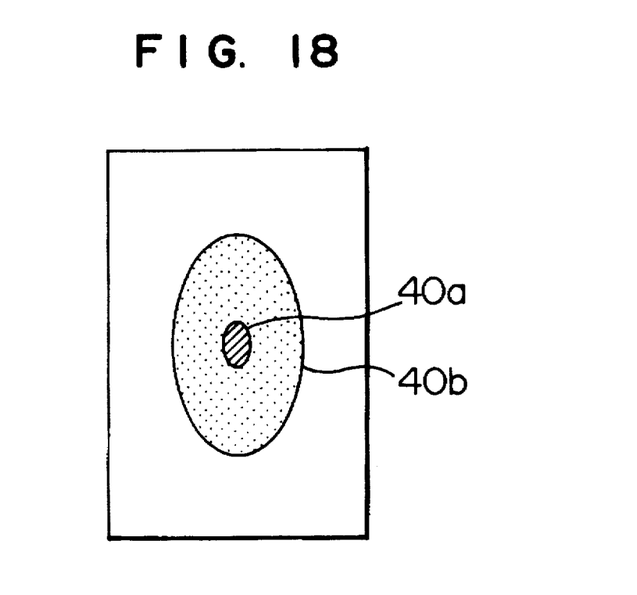
FIG. 18 shows an example of pattern for separating a bundle of rays for wavelength fluctuation detection.

FIG. 17 illustrates a side view showing the structure of a displacement detecting device for an optical head according to a third embodiment. FIG. 18 illustrates separation of the bundle of rays in the third embodiment. In FIG. 17, the same components of the optical head shown in FIG. 1 are designated by the same reference numerals. The difference between the optical head shown in FIG. 17 and the optical head shown in FIG. 1 is the grating 40 which is formed as reflection type. In FIG. 17, the ray from a laser light source 1 are reflected by the grating 40 and focused on the surface of information recording medium 5 by an objective lens 4.

The reflecting ray from the surface of information recording medium 5 is reflected by the grating 40. The surface of the grating 40 is formed with a pattern for separating a bundle of rays into rays for wavelength fluctuation detection and rays for focus displacement and truck displacement detection as shown in FIG. 18. Grating area of the grating 40 formed on the surface of the grating 40 is oval shaped. The center portion (40a) of the grating 40 is for reflecting rays into wavelength fluctuation detector 41. The outer portion (40b) of the grating 40 is for reflecting rays into focus displacement and truck displacement detector 42.

Principle for detecting the wavelength fluctuation is same as that described for the optical head shown in FIG. 1.

We claim:

1. A displacement detecting device for an optical head for reading information recorded on an optical information recording medium by irradiating a surface of the optical information recording medium with light emitted from a light source and detecting reflected light from the irradiated surface of the recording medium, said device comprising:
   optical means for detecting at least focus displacement by utilizing diffracted light of said reflected light and for providing an electrical focus displacement detecting signal,
   said optical means including wavelength fluctuation component detecting means for detecting wavelength fluctuation components also in said reflected light and for providing an electrical wavelength fluctuation detecting signal; and
   electrical means for subtracting said electrical wavelength fluctuation detecting signal received from said wavelength fluctuation component detecting means from said electrical focus displacement detecting signal thereby obtaining a corrected electrical focus displacement detecting signal.

2. A displacement detecting device for an optical head according to claim 1, wherein said wavelength fluctuation detecting means comprises:
   diffracting means for separating a light path for rays for at least one selected from focus displacement detection and track displacement detection and a light path for rays for wavelength fluctuation detection; and
   photodetecting means disposed in the vicinity of a focus position of the rays for wavelength fluctuation detection separated by said diffracting means for detecting position of said rays for wavelength fluctuation detection.

3. A displacement detecting device for an optical head according to claim 1, wherein said wavelength fluctuation detecting means comprises an integrated hologram member having a converging action for converging the rays for focus displacement detection and the rays for wavelength fluctuation detection.

4. A displacement detecting device for an optical head according to claim 2, wherein rays from said optical information recording medium pass through said diffracting means.

5. A displacement detecting device for an optical head according to claim 4, wherein rays for detecting wavelength fluctuation pass through the center area of said diffracting means.

6. A displacement detecting device for an optical head according to claim 2, wherein rays from said optical information recording medium are reflected by said diffracting means.

7. A displacement detecting device for an optical head according to claim 6, wherein rays for detecting wavelength fluctuation reflect at the center area of said diffracting means.

8. A displacement detecting device for an optical head for reading information recorded on an optical information recording medium by irradiating a surface of the optical information recording medium with light emitted from a light source and detecting reflected light from the irradiated surface of the recording medium, said device comprising:
   optical means for detecting focus displacement by utilizing diffracted light of said reflected light and for providing an electrical focus displacement detecting signal;
   diffracting means for separating a light path for rays for at least one selected from focus displacement detection and track displacement detection and a light path for rays for wavelength fluctuation detection;
   photodetecting means disposed in the vicinity of a focus position of the rays for wavelength fluctuation detection separated by said diffracting means for detecting position of said rays for wavelength fluctuation detection and for providing an electrical wavelength fluctuation detecting signal; and
   electrical means for subtracting said electric wavelength fluctuation detecting signal received from said photodetecting means from said electrical focus displacement detecting signal thereby obtaining a corrected electrical focus displacement detecting signal.

9. A displacement detecting device for an optical head according to claim 8, wherein said diffracting means comprises an integrated hologram member having a converging action for converging the rays for focus displacement detection and the rays for wavelength fluctuation detection.

10. A displacement detecting device for an optical head according to claim 8, wherein rays from said optical information recording medium pass through said diffracting means.

11. A displacement detecting device for an optical head according to claim 10, wherein rays for detecting wavelength fluctuation pass through the center area of said diffracting means.

12. A displacement detecting device for an optical head according to claim 8, wherein rays from said optical information recording medium are reflected by said diffracting means.

13. A displacement detecting device for an optical head according to claim 12, wherein rays for detecting wavelength fluctuation pass through the center area of said diffracting means.

14. A displacement detecting device for an optical head adapted for reading information recorded on an optical information recording medium by irradiating a surface of the optical information recording medium with light emitted from a light source and detecting reflected light from the irradiated surface of the recording medium, said device comprising:

a first optical means for transmitting said reflected light to be used for detecting at least one selected from focus displacement and tracking displacement;

a second optical means for separating said reflected light transmitted by said first optical means into a first diffracted light used for at least one selected from focus displacement detection and track displacement detection and a second diffracted light used for wavelength fluctuation detection;

a first photodetecting means for detecting position of said first diffracted light and for providing a first electrical detection signal;

a second photodetecting means for detecting position of said second diffracted light and for providing a second electrical detection signal representative of wavelength fluctuation;

a signal output means, receiving said first electrical detection signal, for providing an electrical displacement detection signal of at least one selected from a focus displacement and a tracking displacement; and an electrical correction means, receiving said electrical displacement detection signal and said second electrical detection signal, for subtracting said second electrical detection signal from said electrical displacement detection signal thereby obtaining a corrected electrical displacement detection signal representing said selected one of the focus displacement and the tracking displacement.

15. A displacement detecting device for an optical head according to claim 14, wherein said first optical means comprises a hologram member.

16. A displacement detecting device for an optical head according to claim 14, wherein said second photodetecting means comprises a position sensing device.

17. A displacement detecting device for an optical head according to claim 14, wherein said second photodetecting means detects displacement of distribution center of said second diffracted light used for wavelength fluctuation detection.

18. A displacement detecting device for an optical head according to claim 17, wherein said second photodetecting means comprises a charge-coupled device.

19. A displacement detecting device for an optical head according to claim 15, wherein said hologram member is a Fresnel zone plate partitioned into a plurality of sectors.

20. A displacement detecting device for an optical head for reading information recorded on an optical information recording medium by irradiating a surface of the optical information recording medium with light emitted from a light source and detecting reflected light from the irradiated surface of the recording medium, said device comprising:

optical means for detecting at least focus displacement by utilizing diffracted light of said reflected light and for providing an electrical focus displacement detecting signal, said optical means including wavelength fluctuation component detecting means for detecting wavelength fluctuation components also in said reflected light and for providing an electrical wavelength fluctuation detecting signal;

said wavelength fluctuation component detecting means including diffracting means for separating a light path for rays for focus displacement detection and a light path for rays for wavelength fluctuation detection, wherein rays from said optical information recording medium pass through said diffracting means;

photodetecting means disposed in the vicinity of a focus position of the rays for wavelength fluctuation detection separated by said diffracting means for detecting position of said rays for wavelength fluctuation detection; and electrical means for subtracting said electrical wavelength fluctuation detecting signal received from said wavelength fluctuation component detecting means from said electrical focus displacement detecting signal thereby obtaining a corrected electrical focus displacement detecting signal.

21. A displacement detecting device for an optical head for reading information recorded on an optical information recording medium by irradiating a surface of the optical information recording medium with light emitted from a light source and detecting reflected light from the irradiated surface of the recording medium, said device comprising:

optical means for detecting at least focus displacement by utilizing diffracted light of said reflected light and providing an electrical focus displacement detecting signal, said optical means including wavelength fluctuation component detecting means for detecting wavelength fluctuation components also in said reflected light and for providing an electrical wavelength fluctuation detecting signal; and means for correcting said electrical focus displacement detecting signal by subtracting therefrom said electrical wavelength fluctuation detecting signal received from said wavelength fluctuation component detecting means.

22. A displacement detecting device for an optical head for reading information recorded on an optical information recording medium by irradiating a surface of the optical information recording medium with light emitted from a light source included in illuminating means and detecting reflected light from the irradiated surface of the recording medium, said device comprising:

signal detecting means including optical means for detecting at least focus displacement by utilizing diffracted light of said reflected light and adapted for providing an electrical focus displacement detecting signal, said optical means including wavelength fluctuation component detecting means for detecting wavelength fluctuation components also in said reflected light and adapted for providing an electrical wavelength fluctuation detecting signal; and electrical correction means for subtracting said electrical wavelength fluctuation detecting signal received from said wavelength fluctuation component detecting means from said electrical focus displacement detecting signal thereby obtaining a corrected electrical focus displacement detecting signal.

* * * * *